United States Patent
Chang et al.

(10) Patent No.: US 11,748,349 B2
(45) Date of Patent: Sep. 5, 2023

(54) CUSTOMIZABLE FILTERING FOR QUERY PLAN STABILITY IN DATABASE SYSTEMS USING ABSTRACT QUERY PLANS

(71) Applicant: SAP SE, Walldorf (DE)

(72) Inventors: Won Jun Chang, Seoul (KR); Jaehyok Chong, Seoul (KR); Sungguk Lim, Seoul (KR); Youngbin Bok, Seoul (KR)

(73) Assignee: SAP SE, Walldorf (DE)

( * ) Notice: Subject to any disclaimer, the term of this patent is extended or adjusted under 35 U.S.C. 154(b) by 108 days.

(21) Appl. No.: 16/835,566

(22) Filed: Mar. 31, 2020

(65) Prior Publication Data

US 2021/0303571 A1  Sep. 30, 2021

(51) Int. Cl.
*G06F 16/2453* (2019.01)

(52) U.S. Cl.
CPC .............. *G06F 16/24542* (2019.01)

(58) Field of Classification Search
None
See application file for complete search history.

(56) References Cited

U.S. PATENT DOCUMENTS

| | | | | |
|---|---|---|---|---|
| 6,510,422 | B1 * | 1/2003 | Galindo-Legaria | .......................... G06F 16/24539 707/999.102 |
| 6,539,371 | B1 * | 3/2003 | Bleizeffer | ............. G06F 16/217 |
| 6,546,381 | B1 * | 4/2003 | Subramanian | .... G06F 16/24542 |
| 2006/0136407 | A1 * | 6/2006 | Dettinger | .......... G06F 16/24526 |
| 2009/0100004 | A1 * | 4/2009 | Andrei | .............. G06F 16/24542 |
| 2009/0106321 | A1 * | 4/2009 | Das | .................... G06F 16/24542 |
| 2010/0076961 | A1 * | 3/2010 | Dettinger | .......... G06F 16/24522 707/E17.141 |
| 2010/0257154 | A1 * | 10/2010 | Pendap | ............. G06F 16/24542 707/718 |
| 2011/0029508 | A1 * | 2/2011 | Al-Omari | ......... G06F 16/24542 707/718 |
| 2017/0322972 | A1 * | 11/2017 | Lee | ....................... G06F 16/137 |
| 2018/0046675 | A1 * | 2/2018 | Zhou | ................. G06F 16/24549 |
| 2018/0060390 | A1 * | 3/2018 | Kern | ................. G06F 16/24539 |

OTHER PUBLICATIONS

SAP, "SAP HANA Troubleshooting and Performance Analysis Guide" SAP HANA Platform 2.0 SPS 04, Version 1.1, Oct. 31, 2019, 298 pages.
U.S. Appl. No. 16/874,822, Bok et al., Query Plan Migration in Database Systems, filed May 15, 2020, 33 of pages.

* cited by examiner

*Primary Examiner* — Augustine K. Obisesan
(74) *Attorney, Agent, or Firm* — Fish & Richardson P.C.

(57) ABSTRACT

Methods, systems, and computer-readable storage media for receiving a query plan and a set of query parameters of the query plan, the query plan corresponding to a query submitted to a database system, and determining that the set of query parameters matches a filter in a set of filters, each parameter in a set of parameters of the filter matching a query parameter in the set of query parameters, and in response: providing the query plan to an abstract query plan generator that generates an abstract query plan based on the query plan, and storing the abstract query plan in an abstract query plan store.

20 Claims, 4 Drawing Sheets

CUSTOMIZABLE FILTERING FOR QUERY PLAN STABILITY IN DATABASE SYSTEMS USING ABSTRACT QUERY PLANS

BACKGROUND

Enterprises leverage database systems to store and access data, and, often, significant amounts of data. Some database systems store thousands to millions of records that are frequently accessed. For example, transactions can be repeatedly executed to access and/or manipulate data stored within a database system. In some examples, transactions include queries that are issued to the database system by clients (e.g., users, applications). Queries can be received as query statements written in a query language (e.g., structured query language (SQL)).

Processing of queries in database systems generally includes a query processor that parses a received query statement (e.g., SQL statement) to create a query plan (also referred to as a query execution plan (QEP)). The query plan is executed by an execution engine to provide a query result. In some examples, before execution, an optimizer optimizes the query plan to enhance performance of the query plan when executed. Performance can be described in terms of time (i.e., time required to execute the query plan) and burden on technical resources (i.e., processing power and/or memory expended to execute the query plan).

There is a drive to optimize overall performance of database systems.

Optimization can improve execution time of transactions, as well as reduce the load on technical resources (e.g., processors, memory) during execution of transactions. In some instances, optimization can be achieved by changing operational parameters of the database system, and/or changing versions of software implementing the database system. For example, the query processor and/or the query optimizer are under nearly constant development to achieve more efficient query plans. Consequently, the resultant query plans for a given query may change from one release of the database system (e.g., version 1 (V1)) to another release of the database system (e.g., version 2 (V2)). In such instances, it is possible that processing of some query statements in the new database system (e.g., V2) has degraded performance as compared with the original database system (e.g., V1).

SUMMARY

Implementations of the present disclosure are directed to query plan stability in database systems. More particularly, implementations of the present disclosure are directed to customizable filtering for selectively generating abstract query plans for query plan stability in database systems.

In some implementations, actions include receiving a first query plan and a first set of query parameters of the first query plan, the first query plan corresponding to a first query submitted to a database system, and determining that the first set of query parameters matches a first filter in a set of filters, each parameter in a first set of parameters of the first filter matching a query parameter in the first set of query parameters, and in response: providing the first query plan to an abstract query plan generator that generates a first abstract query plan based on the first query plan, and storing the first abstract query plan in an abstract query plan store. Other implementations of this aspect include corresponding systems, apparatus, and computer programs, configured to perform the actions of the methods, encoded on computer storage devices.

These and other implementations can each optionally include one or more of the following features: actions further include receiving a second query plan and a second set of query parameters of the second query plan, the second query plan corresponding to a second query submitted to the database system, and determining that the second set of query parameters do not match a filter in the set of filters, and in response not providing the second query plan to the abstract query plan generator; each parameter corresponds to a workload management class of the database system; parameters include schema, object, application username, client, application component name, application component type, application name, database username, and user group name; the first filter is included in the set of filters in response to execution of an alter system statement within the database system, the alter system statement providing a name of the first filter and providing a value for each parameters in the first set of parameters; actions further include deleting the first filter from the set of filters in response to execution of an alter system statement within the database system; and the first query plan is an optimized query plan that is generated based on the first query.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to query plan stability in database systems. More particularly, implementations of the present disclosure are directed to customizable filtering for selectively generating abstract query plans for query plan stability in database systems. Implementations can include actions of receiving a query plan and a set of query parameters of the query plan, the query plan corresponding to a query submitted to a database system, and determining that the set of query parameters matches a filter in a set of filters, each parameter in a set of parameters of the filter matching a query parameter in the set of query parameters, and in response: providing the query plan to an abstract query plan generator that generates an abstract query plan based on the query plan, and storing the abstract query plan in an abstract query plan store.

Implementations of the present disclosure are described in further detail with reference to an example database system. The example database system is provided as the SAP HANA in-memory database system provided by SAP SE of Walldorf, Germany. SAP HANA can be described as a data platform that processes transactions and analytics at the same time on any data type, with built-in advanced analytics and multi-model data processing engines. More particularly, SAP HANA is an in-memory database system. In some examples, an in-memory database system can be described as a database system that uses main memory for data storage. In some examples, main memory includes random access memory (RAM) that communicates with one or more processors (e.g., central processing units (CPUs)), over a memory bus. An-memory database can be contrasted with database management systems that employ a disk storage mechanism. In some examples, in-memory databases are faster than disk storage databases, because internal optimization algorithms can be simpler and execute fewer CPU instructions (e.g., require reduced CPU consumption). In some examples, accessing data in an in-memory database eliminates seek time when querying the data, which provides faster and more predictable performance than disk-storage databases. While SAP HANA is used as an example herein, it is contemplated, however, that implementations of the present disclosure can be realized in any appropriate database system.

Figure 1:
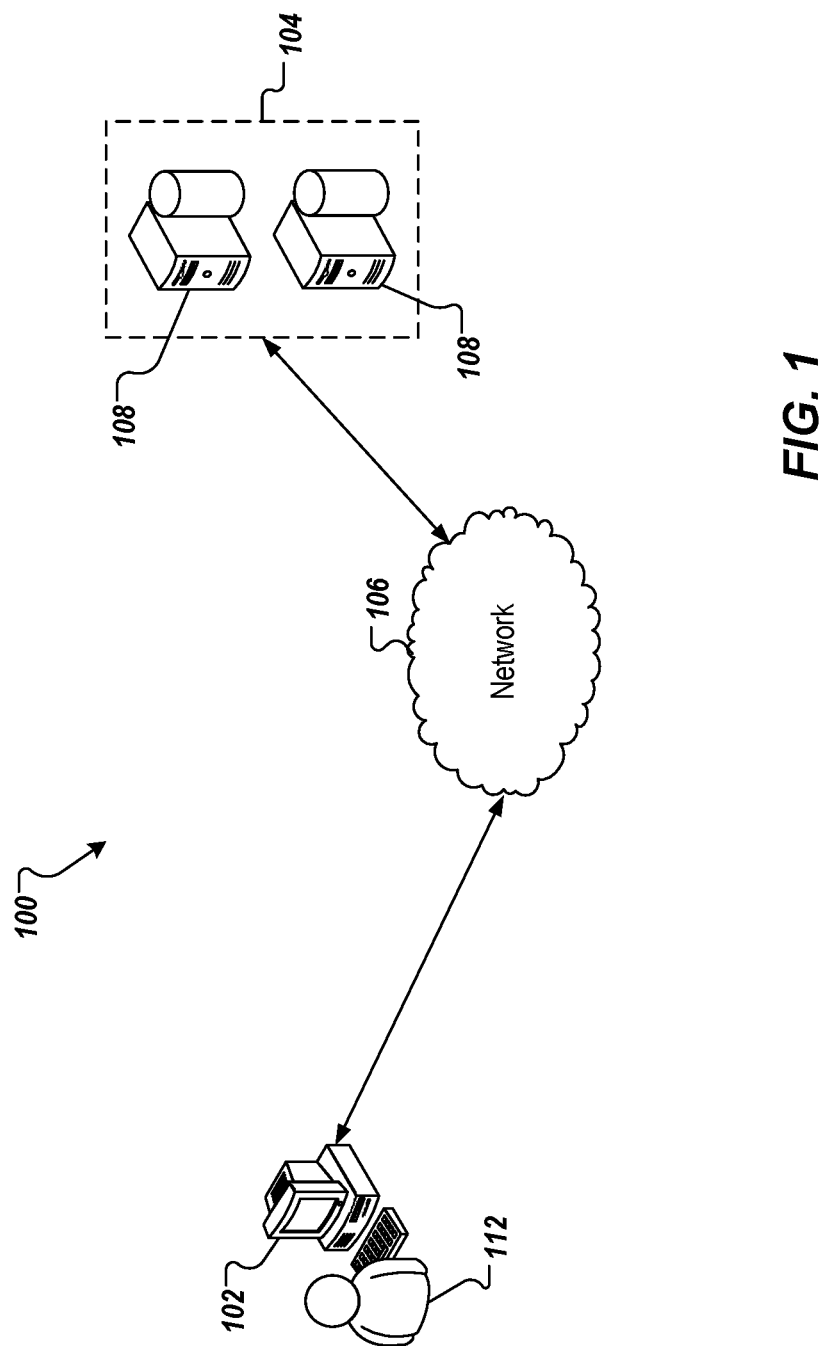
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In some implementations, and as noted above, the server system 104 can host an in-memory database system (e.g., SAP HANA). In addition, and as described in further detail herein, the server system 104 can host a source database system, a target database system, and a query plan stability (QPS) system in accordance with implementations of the present disclosure. As described in further detail herein, the QPS system preserves the performance of queries by capturing query plans in the source database system and reusing the query plans in the target database system. In accordance with implementations of the present disclosure, the QPS system uses abstract query plan filters to selectively capture (record) query plans in the source database system.

To provide further context for implementations of the present disclosure, and as introduced above, enterprises leverage database systems to store and access data, and, often, significant amounts of data. Some database systems store thousands to millions of records that are frequently accessed. For example, transactions can be repeatedly executed to access and/or manipulate data stored within a database system. In some examples, transactions include queries that are issued to the database system by clients (e.g., users, applications). Queries can be received as query statements written in a query language (e.g., structured query language (SQL)).

Processing of queries in database systems generally includes a query processor that parses a received query statement (e.g., SQL statement) to create a query plan (also referred to as a query execution plan (QEP)). The query plan is executed by an execution engine to provide a query result. In some examples, before execution, an optimizer optimizes the query plan to enhance performance of the query plan when executed. Performance can be described in terms of time (i.e., time required to execute the query plan) and burden on technical resources (i.e., processing power and/or memory expended to execute the query plan).

There is a drive to optimize overall performance of database systems. Optimization can improve execution time of transactions, as well as reduce the load on technical resources (e.g., processors, memory) during execution of transactions. In some instances, optimization can be achieved by changing operational parameters of the database system, and/or changing versions of software implementing the database system. For example, the query processor and/or the query optimizer are under nearly constant development to achieve more efficient query plans. Consequently, the resultant query plans for a given query may change from one release of the database system (e.g., version 1 (V1)) to another release of the database system (e.g., version 2 (V2)). In such instances, it is possible that processing of some query statements in the new database system (e.g., V2) has degraded performance as compared with the original database system (e.g., V1).

In view of this, a QPS system can be employed to guarantee the performance of a query after new system upgrades. The QPS system enables preservation of a query's execution plan by capturing an abstraction of the plan (referred to herein as an abstract query plan (ASP)) and reusing the abstract query plan after the upgrade to regenerate the original query plan (e.g., in the new database system) and retain the original performance.

Some traditional QPS systems record abstract query plans for every query processed by the source database system. This results in a significant burden on technical resources (e.g., processing power and memory to provide and store the abstract query plans). Further, such an approach captures every type of query including relatively simple queries. Such queries do not face performance issues when reused in the target database system. Consequently, generating and storing abstract query plans for such queries need not be performed and results in wasteful expense of technical resources. Some traditional QPS systems enable limits to be set to limit the number of queries, for which abstract query plans are generated. Example limits can include limiting the number of abstract query plans that are generated and limiting the memory size consumed for storing abstract query plans. In such systems, abstract query plans are generated for received queries until at least one limit is reached (e.g., until the number of generated abstract query plans meets the number limit, until the amount of memory consumed by the generated abstract query plans meets the memory limit).

Such traditional approaches, however, have disadvantages. As noted above, disadvantages include inefficient use of technical resources due to generating abstract query plans for all queries. This inefficient use is highlighted by storage of abstract query plans for some queries that would not have performance issues in the new database system (i.e., abstract query plans for queries that do not benefit from having an abstract query plan). Consequently, creation of abstract query plans for such are created, even though not needed.

In view of this, and as introduced above, implementations of the present disclosure are directed to customizable filtering for selectively generating abstract query plans for query plan stability in database systems. More particularly, implementations of the present disclosure enable a set of filters to be defined, each filter providing a set of properties to selectively trigger generation of an abstract query plan for a query received by a database system (e.g., a source database system). As described in further detail herein, the filters enable fine grain control over, which queries are captured for generating respective abstract query plans. In this manner, technical resources are conserved relative to traditional approaches to generation of abstract query plans.

In accordance with implementations of the present disclosure, the set of filters is used to selectively capture and generate abstract query plans for only the queries satisfying the conditions defined in each filter. In some implementations, the filters use workload management classes as predicates, provide level-wise control of the target queries (e.g., levels including database, session, user, schema), and can be configured for capture of only particular types of query plans. An example type of query plan can include online analytical processing (OLAP) queries for OLAP workloads, which typically involve data analysis. In some examples, workload management class includes the following example variables: database level (e.g., object name, schema name), session level (e.g., application user name, client, application component name, application component type, application name), and user level (e.g., user name, user group name). In some examples, configuration and filters are stored in the persistency for preservation after server shutdown and restarts.

In further detail, and as introduced above, one or more filters in the set of filters are applied to queries to limit the capture process to specific target queries (i.e., queries matching the conditions of a respective filter). That is, the capture is limited to queries that match a filter in the set of filters. In some implementations, each filter can be based on username and/or by workload class property. In some examples, filtering by username is done at run-time as the capture process is initiated. An example of this is described in further detail below. In some examples, when filtering by workload class property, the filters are set in advance, so that they apply permanently, but can be removed when no longer required. Table 1, below, provides an example mapping of property-value pairs that can be used in filtering:

TABLE 1

Example Field Names and Descriptions for Filtering

| Field Name | Description |
| --- | --- |
| Schema | Schema name of object defined in the OBJECT NAME property. |
| Object | Name of the object (e.g., TABLE, VIEW, PROCEDURE) used in the application. |
| Application Username | Name of the user logged in to the application. |
| Client | Identifier that uniquely identifies the client submitting the query (e.g., 000). |
| Application Component Name | Name of the application component. This value is used to identify sub-components of an application, such as CRM inside the SAP Business Suite. For example, /SSB/ALERT_NOTIFICATION_REPORT. |
| Application Component Type | Name of the component type. This value is used to provide coarse-grained properties of the workload generated by application components. |
| Application Name | Name of the application. |
| Database Username | Name of the database user. For example, SYSTEM. |
| User Group Name | Name of the user group. |

In some implementations, to add one or more filters, an alter system statement can be executed within the database system. An example format for an alter system statement to add one or more filters includes:

ALTER SYSTEM ADD ABSTRACT SQL PLAN FILTER <filter_name>SET <predicate_list>
where:
    <filter_name>::=<string_literal>
    <predicate_list>::=<predicate>[, <predicate_list>]
    <predicate>::=<key>=<value>|<key> IN (<value_list>)
    <key>::=<string_literal>
    <value_list>::=<value>[, <value_list>]
    <value>::=<string_literal>

In some examples, the alter system statement is provided as, or part of, a query statement (e.g., SQL statement). Consequently, a client (e.g., a SQL client) can be used to input the alter system statement.

In some examples, the workload mapping specifies predicates of USER NAME, APPLICATION USER NAME, APPLICATION NAME, etc., as described by way of example herein. In some examples, the predicates provided in a filter are conjunctively combined. In this manner, an incoming query should satisfy all the predicates to be matched with the filter and have an abstract query plan generated therefor.

Execution of an alter system statement, such as that above, results in creation of a filter. In some examples, the filter is provided in Javascript object notation (JSON) format, as provided by way of examples herein. Multiple filters can be added and the filters are disjunctively combined. In this manner, queries are checked against each filter, and if a query is matched with any filter, an abstract query plan is generated for the query.

An example alter system statement to concurrently add a first example filter and a second example filter includes:
ALTER SYSTEM ADD ABSTRACT SQL PLAN FILTER ['application_filter_1' SET 'application name'=['HDBStudio', 'CnR'], 'application user name'='i052870', 'application_filter_2' SET 'user name'='SYSTEM', 'application name'='PMUT', 'application user name'=['Worker #25', 'Worker #26']];

The first example filter and the second example filter are provided (in JSON format) as:
{
  "application_filter": [
    {
      "FILTER NAME": "application_filter_1",
      "APPLICATION NAME": ["HDBStudio", "CnR"],
      "APPLICATION USER NAME": ["i052870"]
    }, {
      "FILTER NAME": "applcation_filter_2",
      "USER NAME": ["SYSTEM"],
      "APPLICATION NAME": ["PMUT"],
      "APPLICATION USER NAME": ["Worker #25", "Worker #26"]
    }
  ]
}

Application of the first example filter and the second example filter results in the QPS system capturing queries with the properties of:
(application name is "HDBStudio" OR "CnR") AND
(application user name is "i052870")
OR
(user name is "SYSTEM") AND
(application name is "PMUT") AND
(application user name is "Worker #25" OR "Worker #26")

Another example alter system statement to add a third example filter is provided as:
ALTER SYSTEM ADD ABSTRACT SQL PLAN FILTER 'MyFilter01' SET 'application name'='App2', 'application user name'='TEST';

The third example filter is provided (in JSON format) as:
{
  "application_filter": [
    {
      "FILTER NAME": "MyFilter01",
      "APPLICATION NAME": ["App2"],
      "APPLICATION USER NAME": ["TEST"]
    }
  ]
}

In some implementations, to remove one or more filters, an alter system statement can be executed within the database system. An example format for an alter system statement to remove filters includes:
ALTER SYSTEM REMOVE ABSTRACT SQL PLAN FILTER <target_filter>
where:
    <target_filter>::=<filter_name>|ALL
In some examples, the alter system statement can identify a single filter by filter name, and in response to execution of the alter system statement, the identified filter is removed. In some examples, the alter system statement can identify multiple filters by filter names, and in response to execution of the alter system statement, the identified filters are removed. In some examples, the alter system statement can identify that all filters (e.g., ALL), and in response to execution of the alter system statement, all filters are removed.

Continuing with the example filters provided above, a first example alter statement to remove filters can be provided as:
ALTER SYSTEM REMOVE ABSTRACT SQL PLAN FILTER 'MyFilter01';

In response to execution of the first example alter statement, the filter MyFilter01 is removed from the set of filters. A second example alter statement to remove filters can be provided as:
ALTER SYSTEM REMOVE ABSTRACT SQL PLAN FILTER 'MyFilter01', 'applcation_filter_2';

In response to execution of the second example alter statement, the filter MyFilter01 and the filter applcation_filter_2 are removed from the set of filters. A third example alter statement to remove filters can be provided as:
ALTER SYSTEM REMOVE ABSTRACT SQL PLAN FILTER ALL;

In response to execution of the third example alter statement, all of the filters are removed from the set of filters (i.e., the set of filters becomes an empty set).

Figure 2:
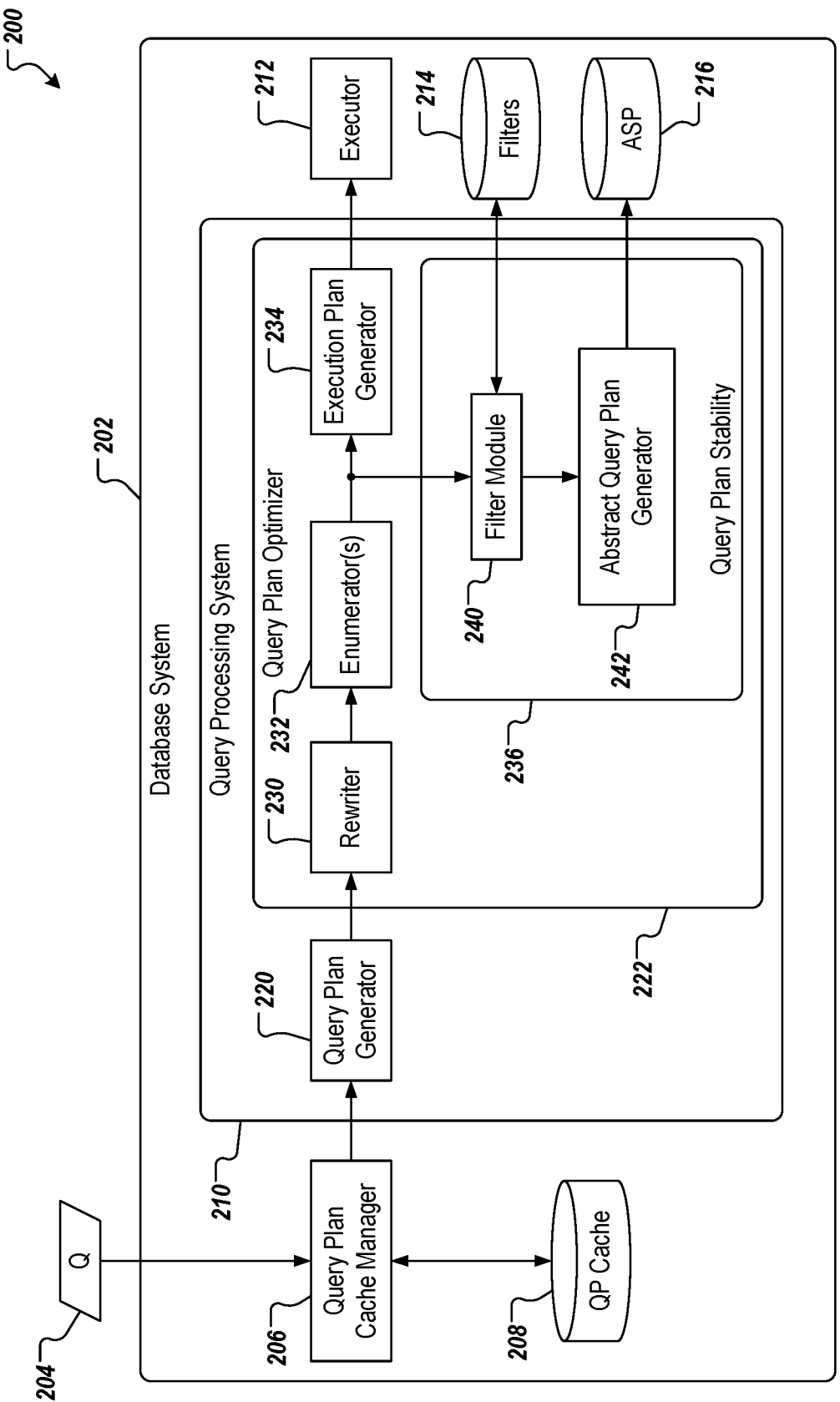
FIG. 2 depicts a conceptual architecture providing query plan stability functionality in a database system.

FIG. 2 depicts a conceptual architecture 200 providing QPS functionality in a database system. In some examples, the database system can be described as a source database system (e.g., executing V1) and the QPS functionality is provided to record queries executed in the source database system as abstract query plans (ASPs). Subsequently, the abstract query plans provide from the source database system can be used to recreate the queries in a target database system (e.g., executing V2).

In the example of FIG. 2, the conceptual architecture 200 includes a database system 202 that receives a query 204. In some examples, the query 204 includes metadata that provides a set of query parameters associated with the query. In some examples, the query parameters include one or more of: schema, object, application username, client, application component name, application component type, application name, database username, and user group name. The database system 202 processes the query 204 to provide a query result. For example, a client (e.g., user, application) can submit the query 204 to the database system 202, which processes the query to generate the query result, and the query result is sent to the client. The query 204 is provided as a set of query statements (e.g., SQL statements) that includes one or more query statements.

In further detail, the database system 202 includes a query plan cache manager 206, a query plan cache 208, a query processing system 210, an executor 212, a filters store 214, and a abstract query plan (ASP) store 216. In some examples, the query plan cache manager 206 receives the query 204 and determines whether a query plan had already been generated and cached for the query 204. That is, the query plan cache manager 206 determines whether the query 204 had already been received and processed by the database system 202. If the query 204 had already been received and processed by the database system 202, a query plan for the query 204 is retrieved from the query plan cache 208 for processing to generate the query result. If the query 204 had not already been received and processed by the database system 202, the query 204 is processed by the query processing system 210 to generate a query plan.

In the example of FIG. 2, the query processing system 210 includes a query plan generator 220 and a query plan optimizer 222. The query plan generator 220 processes the query 204 to generate an initial query plan. In some examples, processing of the query 204 includes parsing the query 204 to provide a parsed query, checking the parsed query, and compiling the parsed query to provide the initial query plan. The initial query plan is input to the query plan optimizer 222, which provides a query plan for execution by the database system 202. Accordingly, the query plan is an optimized version of the initial query plan. The query plan is provided to the executor 212 for execution to generate a query result.

In the example of FIG. 2, the query plan optimizer 222 includes a rewriter module 230, an enumerator module 232, an execution plan generator module 234, and a query plan stability module 236. In some examples, the rewriter module 230 receives the initial query plan and rewrites the initial query plan to provide a rewritten query plan. In some examples, rewriting of the initial query plan can include changing an order of operations within the initial query plan to provide the rewritten query plan. The rewritten query plan is provided to the enumerator module 232, which includes one or more enumerators. Example enumerators include a logical enumerator and a cost-based enumerator. The enumerator module 232 process the rewritten query plan to provide an optimized query plan. The optimized query plan is provided to the execution plan generator 234, which provides the query plan (e.g., a query execution plan (QEP)) for execution by the executor 212.

The optimized query plan is provided to the query plan stability module 236. In accordance with implementations of the present disclosure, the query plan stability module 236 receives the optimized query plan and the set of parameters (i.e., provided in the metadata of the query 204), and applies a set of filters to determine whether an abstract query plan is to be generated for the query 204. The query plan stability module 236 includes a filter module 240 and an abstract query plan generator 242.

In some implementations, the filter module 240 compares parameters in the set of query parameters to filters in a set of filters. In some examples, the filters in the set of filters is empty (i.e., either no filters have been set, or any previously set filter has been removed). If the set of filters is empty, the filter module 240 provides the optimized query plan to the abstract query plan generator 242, which process the optimized query plan to provide an abstract query plan therefor. The abstract query plan is stored in the ASP store 216.

If the set of filters includes at least one filter, the parameters in the set of query parameters are compared to the set of parameters of each filter to determine whether an abstract query plan is to be generated. If one or more parameters match the set of parameters of a filter, which define a condition for triggering generation of an abstract query plan, the filter module 240 provides the optimized query plan to the abstract query plan generator 242, which process the optimized query plan to provide an abstract query plan therefor. The abstract query plan is stored in the ASP store 216.

For example, and as provided above, the third example filter (myFilter01) includes the set of parameters "APPLICATION NAME": ["App2"], "APPLICATION USER NAME": ["TEST"]. If the set of query parameters of the query include "APPLICATION NAME": ["App2"], "APPLICATION USER NAME": ["TEST"], it is determined that the set of query parameters matches the set of parameters of the filter (MyFilter01). In response, the filter module 240 provides the optimized query plan to the abstract query plan generator 242, which process the optimized query plan to provide an abstract query plan therefor. The abstract query plan is stored in the ASP store 216.

In some examples, it is not necessary that every query parameter matches a parameter in the set of parameters of the filter. For example, the set of query parameters of the query include "APPLICATION NAME": ["App2"], "APPLICATION USER NAME": ["TEST"], "CLIENT": ["01234"]. In this example, it is still determined that the set of query parameters matches the set of parameters of the filter (MyFilter01), even though the filter does not set a condition for CLIENT.

As another example, and continuing with the third example filter (myFilter01), if the set of query parameters of the query include "APPLICATION NAME": ["App1"], "APPLICATION USER NAME": ["TEST"], it is determined that the set of query parameters does not match the set of parameters of the filter (MyFilter01). In response, the filter module 240 does not provide the optimized query plan to the abstract query plan generator 242, and no abstract query plan is generated for the query.

By way of non-limiting example, an example query can be provided as:

select * from t1 where t1 is a table stored within the database system 202. An example abstract query plan (in JSON format) for the above example query can be provided as: {"alp_rels":[{"alp_Rel": {"alias":"T1","alp_id":0,"enumerated_by": 174,"field_names":[ ],"guide":{"alp_Guide":{"hints":[{"hint": "HEX_TABLE_SCAN"}],"type":0}},"hash_partition_column":−2147483648, "input_size":10000,"intermediate_alternative":false,"is_ap_inject ed":false,"is_esx_node":false,"is_view_cache":false,"join_table_n ame":" ", "locked":false,"logically_enumerated":false,"output_colum n_size":1,"partition_search_ids":[ ],"physical_operator_type":49,"referenced_cols":[{"col":0}],"rel_id": 1000000,"rel_type":6,"remot e_srv_id":−1,"schema_name":"SYSTEM","table_name":"T1", "table type":0,"trex_externalkey_pos":−2147483648,"trex rel_id":−1, "trex_rowid_needed":false,"trex_rowid_pos":1000001, "used_cols": [{"col":0},{"col":1000001}],"volume_id":1}},{"alp_Rel": {"alp_id":1,"child_rel_id":0, "enumerated_by":174,"intermediate_al ternative":false, "is_esx_node":false,"is_hex":true,"locked":false "logically_enumerated":false,"output_column_size":0, "physical_op erator_type":49,"project_col_aliases": [{"alias":"NULL"}],"project col_labels":[{"label":"A"}], "project_cols":[{"alp_Exp":{"col_id":0,"exp_type":0, "field_name":"A","is_grouping_id":false,"is_table key": false,"org_table_name":"T1","position":−1,"prefetch": false,"promoted_type":{"ftc":0,"length":4294967295, "scale":0},"re al_result_type":{"ftc":3,"length":10,"scale": 0},"rel_id":1000000, "result_type":{"ftc":3,"length":10, "scale":0},"schema_name":"SYST EM","table_name": "T1"}}],"rel_type":3,"trex rel_id":−1, "volume_id":2}}], "root rel_id":1}

Figure 3:
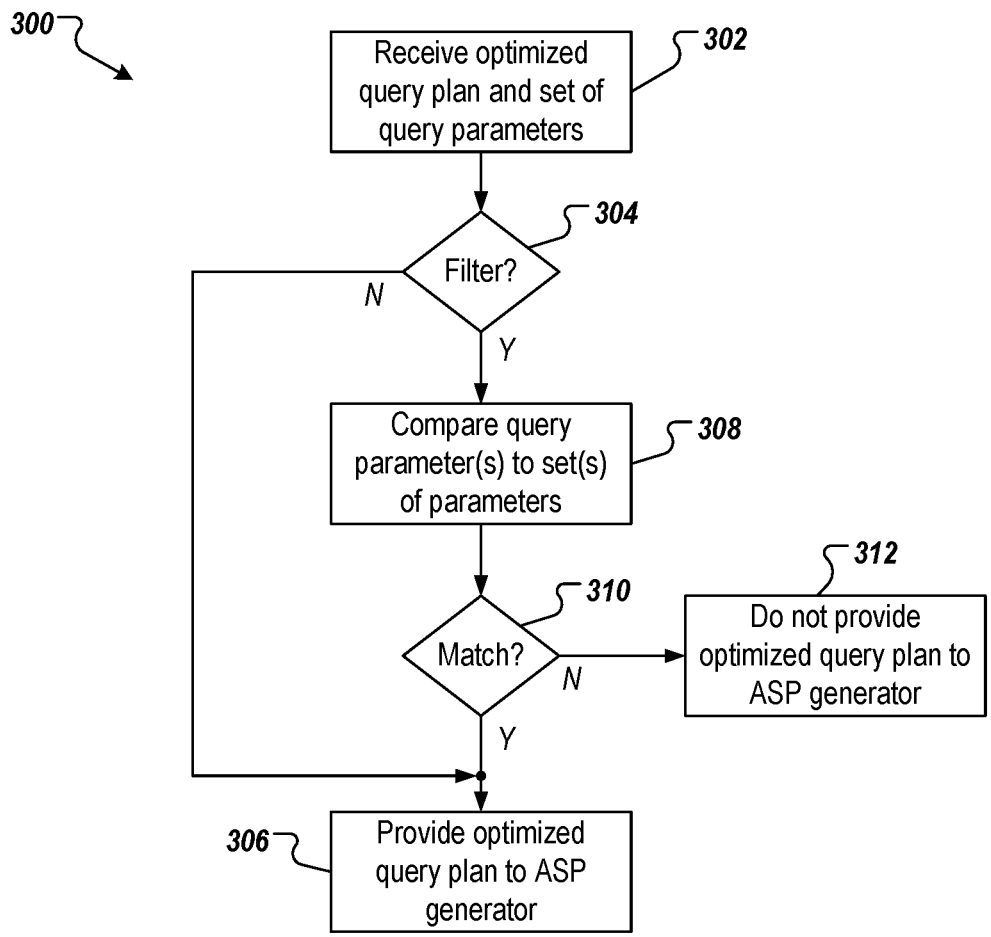
FIG. 3 depicts an example process that can be executed in accordance with implementations of the present disclosure.

FIG. 3 depicts an example process 300 that can be executed in accordance with implementations of the present disclosure. In some examples, the example process 300 is provided using one or more computer-executable programs executed by one or more computing devices.

An optimized query plan and a set of query parameters is received (302). For example, the filter module 240 of FIG. 2 receives the optimized query plan and a set of query parameters provided with the query 204, the optimized query plan being provided based on the query 204, as described herein. It is determined whether any filters are set (304). For example, the filter module 240 determined whether any filters are provided in the filter store 214. That is, it is determined whether the set of filters is empty (i.e., no filter is set). If no filter is set, the optimized query plan is provided to the ASP generator (306). For example, the filter module 240 provides the optimized query plan to the ASP generator 242, which processes the optimized query plan to provide an ASP and stores the ASP in the ASP store 216.

If at least one filter is set, it is determined whether there is a match to a filter (308). For example, query parameters in the set of query parameters are compared to parameters in the set of parameters for each filter. If there is a match to a filter, the optimized query plan is provided to the ASP generator (306). For example, if the parameters in the set of parameters each have a match to a query parameter in the set of query parameters, it is determined that there is a match to the filter. If the parameters in the set of parameters do not each have a match to a query parameter in the set of query parameters, it is determined that there is not a match to the filter. If there is not a match to a filter, the optimized query plan is not sent to the ASP generator (310). That is, no abstract query plan is generated for the received query. If there is a match to a filter, the optimized query plan is sent to the ASP generator (306). For example, the filter module 240 provides the optimized query plan to the ASP generator 242, which processes the optimized query plan to provide an ASP and stores the ASP in the ASP store 216.

Figure 4:
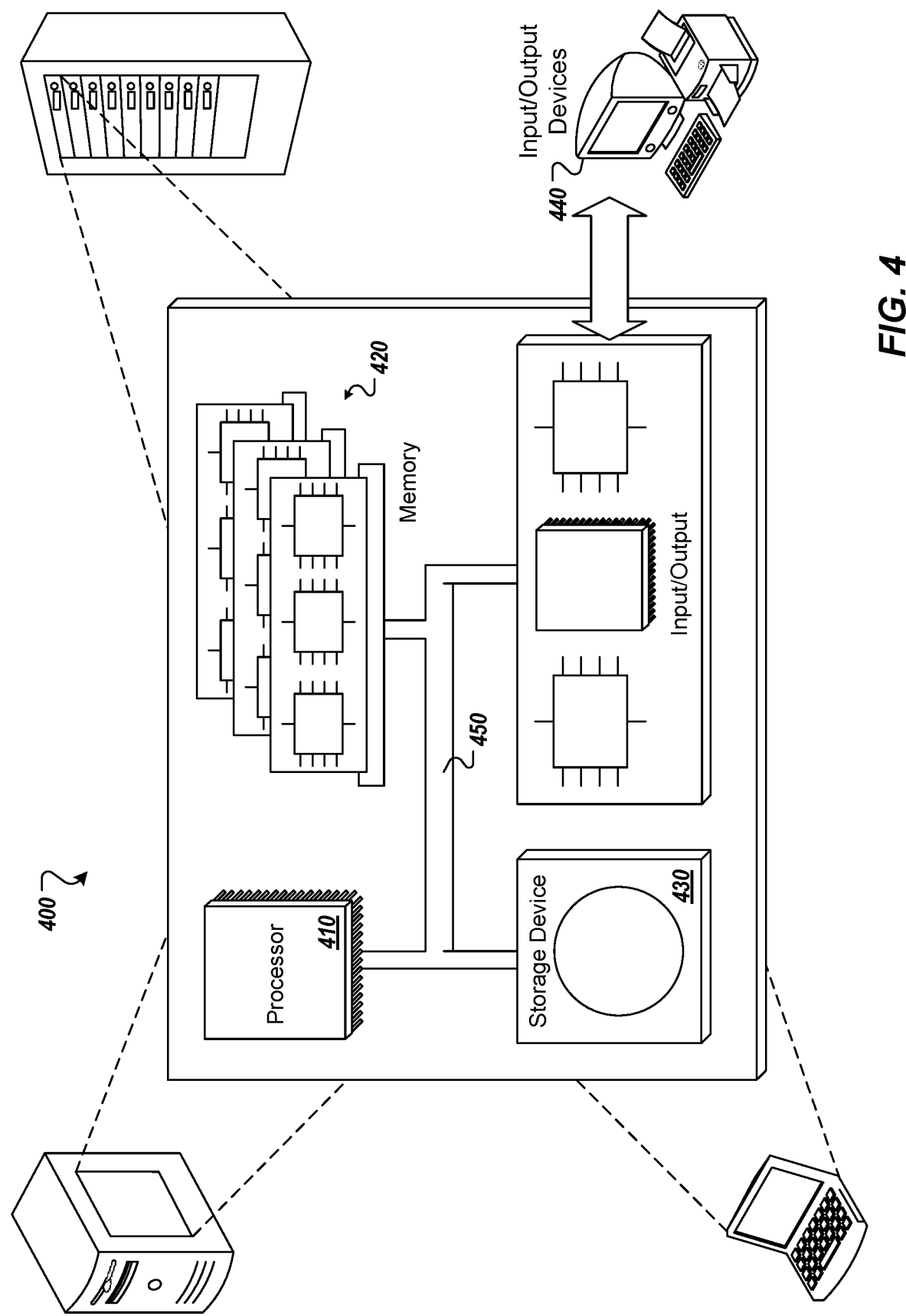
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for selectively providing abstract query plans in database systems, the method being executed by one or more processors and comprising:
receiving, by a query processing system of a database system, a query for execution within a database system;
processing, by a query plan generator of the query processing system, the query to generate an initial query plan;
generating, by a query plan optimizer of the query processing system, a first query plan as an optimization of the initial query plan, the first query plan being executed within the database system to provide a query result;
receiving, by a query plan stability system of the query plan optimizer and in parallel with execution of the first query plan, the first query plan and a first set of query parameters of the first query plan, the first query plan corresponding to a first query submitted to a source database system, the source database system being implemented by a first release of a software; and
determining, by a filter module of the query plan stability system, that the first set of query parameters matches a first filter in a set of filters, each parameter in a first set of parameters of the first filter matching a query parameter in the first set of query parameters, one or more parameters in the first set of query parameters comprising respective predicates as workload management classes for level-wise control of target queries, for which abstract query plans are to be generated, and in response:
providing the first query plan to an abstract query plan generator of the query plan stability system that generates a first abstract query plan based on the first query plan, and
storing the first abstract query plan in an abstract query plan store, the first abstract query plan being executable to recreate a query in a target database system, the target database system being implemented by a second release of the software.

2. The method of claim 1, further comprising:
receiving a second query plan and a second set of query parameters of the second query plan, the second query plan corresponding to a second query submitted to the database system; and
determining that the second set of query parameters do not match a filter in the set of filters, and in response not providing the second query plan to the abstract query plan generator.

3. The method of claim 1, wherein parameters comprise schema, object, application username, client, application component name, application component type, application name, database username, and user group name.

4. The method of claim 1, wherein the first filter is included in the set of filters in response to execution of an alter system statement within the database system, the alter system statement providing a name of the first filter and providing a value for each parameter in the first set of parameters.

5. The method of claim 1, further comprising deleting the first filter from the set of filters in response to execution of an alter system statement within the database system.

6. The method of claim 1, wherein the first query plan is an optimized query plan that is generated based on the first query.

7. The method of claim 1, wherein levels comprise a database level, a session level, and a user level.

8. A non-transitory computer-readable storage medium coupled to one or more processors and having instructions stored thereon which, when executed by the one or more processors, cause the one or more processors to perform operations for selectively providing abstract query plans in database systems, the operations comprising:
receiving, by a query processing system of a database system, a query for execution within a database system;
processing, by a query plan generator of the query processing system, the query to generate an initial query plan;
generating, by a query plan optimizer of the query processing system, a first query plan as an optimization of the initial query plan, the first query plan being executed within the database system to provide a query result;
receiving, by a query plan stability system of the query plan optimizer and in parallel with execution of the first query plan, the first query plan and a first set of query parameters of the first query plan, the first query plan corresponding to a first query submitted to a source database system, the source database system being implemented by a first release of a software; and
determining, by a filter module of the query plan stability system, that the first set of query parameters matches a first filter in a set of filters, each parameter in a first set of parameters of the first filter matching a query parameter in the first set of query parameters, one or more parameters in the first set of query parameters comprising respective predicates as workload management classes for level-wise control of target queries, for which abstract query plans are to be generated, and in response:
providing the first query plan to an abstract query plan generator of the query plan stability system that generates a first abstract query plan based on the first query plan, and
storing the first abstract query plan in an abstract query plan store, the first abstract query plan being executable to recreate a query in a target database system, the target database system being implemented by a second release of the software.

9. The computer-readable storage medium of claim 8, wherein operations further comprise:
receiving a second query plan and a second set of query parameters of the second query plan, the second query plan corresponding to a second query submitted to the database system; and
determining that the second set of query parameters do not match a filter in the set of filters, and in response not providing the second query plan to the abstract query plan generator.

10. The computer-readable storage medium of claim 8, wherein parameters comprise schema, object, application username, client, application component name, application component type, application name, database username, and user group name.

11. The computer-readable storage medium of claim 8, wherein the first filter is included in the set of filters in response to execution of an alter system statement within the database system, the alter system statement providing a name of the first filter and providing a value for each parameter in the first set of parameters.

12. The computer-readable storage medium of claim 8, wherein operation further comprise deleting the first filter from the set of filters in response to execution of an alter system statement within the database system.

13. The computer-readable storage medium of claim 8, wherein the first query plan is an optimized query plan that is generated based on the first query.

14. The computer-readable storage medium of claim 8, wherein levels comprise a database level, a session level, and a user level.

15. A system, comprising:
   a computing device; and
   a computer-readable storage device coupled to the computing device and having instructions stored thereon which, when executed by the computing device, cause the computing device to perform operations for selectively providing abstract query plans in database systems, the operations comprising:
      receiving, by a query processing system of a database system, a query for execution within a database system;
      processing, by a query plan generator of the query processing system, the query to generate an initial query plan;
      generating, by a query plan optimizer of the query processing system, a first query plan as an optimization of the initial query plan, the first query plan being executed within the database system to provide a query result;
      receiving, by a query plan stability system of the query plan optimizer and in parallel with execution of the first query plan, the first query plan and a first set of query parameters of the first query plan, the first query plan corresponding to a first query submitted to a source database system, the source database system being implemented by a first release of a software; and
      determining, by a filter module of the query plan stability system, that the first set of query parameters matches a first filter in a set of filters, each parameter in a first set of parameters of the first filter matching a query parameter in the first set of query parameters, one or more parameters in the first set of query parameters comprising respective predicates as workload management classes for level-wise control of target queries, for which abstract query plans are to be generated, and in response:
         providing the first query plan to an abstract query plan generator of the query plan stability system that generates a first abstract query plan based on the first query plan, and
         storing the first abstract query plan in an abstract query plan store, the first abstract query plan being executable to recreate a query in a target database system, the target database system being implemented by a second release of the software.

16. The system of claim 15, wherein operations further comprise:
   receiving a second query plan and a second set of query parameters of the second query plan, the second query plan corresponding to a second query submitted to the database system; and
   determining that the second set of query parameters do not match a filter in the set of filters, and in response not providing the second query plan to the abstract query plan generator.

17. The system of claim 15, wherein parameters comprise schema, object, application username, client, application component name, application component type, application name, database username, and user group name.

18. The system of claim 15, wherein the first filter is included in the set of filters in response to execution of an alter system statement within the database system, the alter system statement providing a name of the first filter and providing a value for each parameter in the first set of parameters.

19. The system of claim 15, wherein operation further comprise deleting the first filter from the set of filters in response to execution of an alter system statement within the database system.

20. The system of claim 15, wherein levels comprise a database level, a session level, and a user level.

\* \* \* \* \*